M. A. ILLGEN.
SUMMER AUTOMOBILE HOOD.
APPLICATION FILED OCT. 7, 1918.
1,316,956.
Patented Sept. 23, 1919.
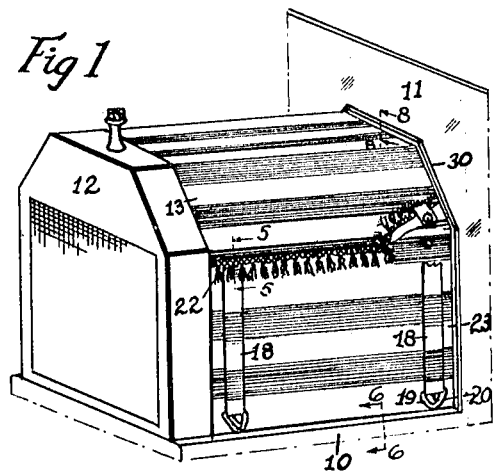
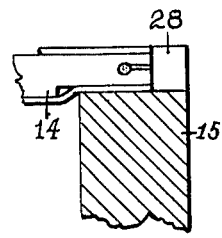
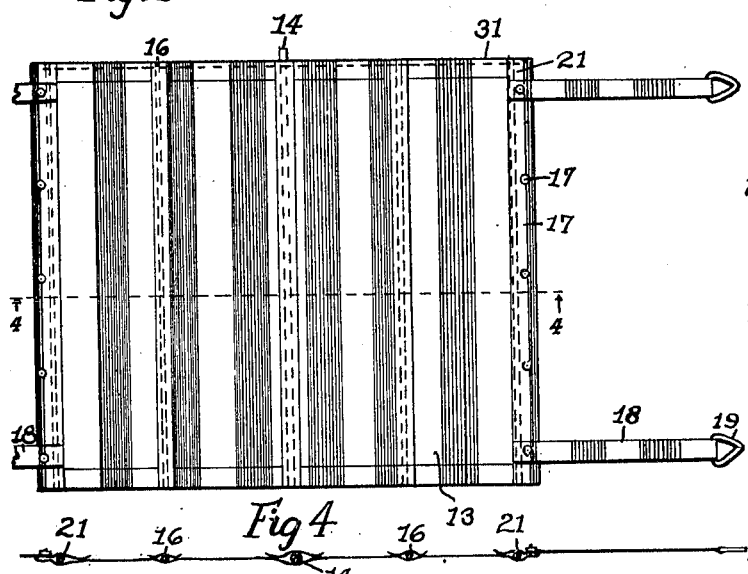
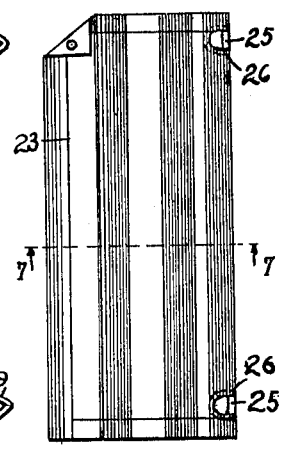
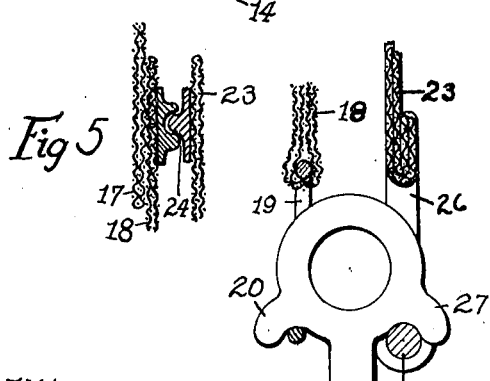
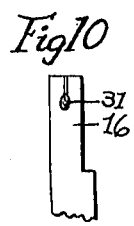
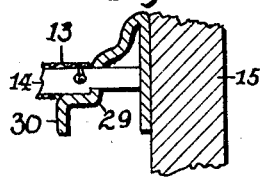
Witness
Inventor
Mary A. Illgen,
By Quin r Quin Atty's

UNITED STATES PATENT OFFICE.

MARY A. ILLGEN, OF DES MOINES, IOWA.

SUMMER AUTOMOBILE-HOOD.

1,316,956.    Specification of Letters Patent.    Patented Sept. 23, 1919.

Application filed October 7, 1918. Serial No. 257,292.

*To all whom it may concern:*

Be it known that I, MARY A. ILLGEN, a citizen of the United States, and a resident of Des Moines, in the county of Polk and State of Iowa, have invented a certain new and useful Summer Automobile-Hood, of which the following is a specification.

The object of my invention is to provide a summer automobile hood of such material and so made that it may be opened for admitting a greater amount of air to the engine than is admitted by the ordinary metal hoods.

My hood is preferably made of water proof cloth and is arranged with detachable side members.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a perspective view of the front portion of an automobile equipped with a hood embodying my invention.

Fig. 2 shows an inverted plan view of the hood laid out flat when the detachable side members are removed.

Fig. 3 shows a plan view of one of the side members taken from the inside.

Fig. 4 shows a detail sectional view taken on the line 4—4 of Fig. 2.

Fig. 5 shows a vertical, sectional view through the main portion of the hood near one side edge thereof, showing the member slightly separated from the main portion of the hood for illustrating the manner of fastening the parts together.

Fig. 6 shows a vertical, sectional view taken on the line 6—6 of Fig. 1.

Fig. 7 shows a sectional view through the detachable member shown in Fig. 3.

Fig. 8 shows a vertical, sectional view through the central, rear portion of the hood when installed on the car showing part of the car frame.

Fig. 9 shows a vertical, central, sectional view through the rear portion of the hood at the rear end thereof when mounted on a slightly different type of automobile frame; and Fig. 10 shows a detail, sectional view of one of the rods showing the manner in which the wire is mounted therein.

It is well-known that in hot weather it is desirable to admit more air to the engine than is ordinarily done, and for this purpose it is my object to do away with the ordinary metal hood and to substitute therefor a flexible cloth hood which can be readily rolled up and stored in a small space.

In the accompanying drawings I have used the reference numeral 10 to indicate generally the frame of the front portion of an automobile having the dash 11 and the radiator 12.

My improved hood comprises a main body portion 13, comprising a rectangular piece of water proof material which may have stripes as shown, or be otherwise made or decorated to give an unusual or artistic appearance to the hood.

The main portion 13 of the hood is designed to form a top or cover portion only, and extends downwardly slightly near its side edges, as illustrated in Fig. 1, but terminates at such points as to leave the openings at the sides.

Extended from front to rear through the central portion of the main hood and secured to the under surface thereof is a supporting rod 14 which projects rearwardly from the hood and is designed to extend into the opening 15 in the frame of the machine.

The front portion of the rod 14 fits into the ordinary receiving member on the radiator.

Spaced from the rod 14 on opposite sides thereof are rods 16 extending fore-and-aft and secured to the under surface of the hood member 13.

On the under surface of the hood member 13 near the side edges thereof are suitable fastening devices 17.

Secured to the under surface of the hood member 13 near the side edges thereof are straps 18 which may or may not be of slightly resilient material, and which when the hood is installed, extend downwardly, as illustrated in Fig. 1.

Near their free ends the portions 18 are provided with rings 19 which may be hooked over suitable hook devices 20 on the frame of the car for drawing the hood member 13 taut.

Rods 21, similar to the rods 16, and parallel therewith are secured to the under surface of the hood member 13 at the side edges thereof.

The hood member 13 may be provided at its side edges with fringe 22 for covering the connection between the hood member 13 and the detachable side member of the hood.

There are provided detachable side members 23 having at their upper edges fastening members 24, arranged to coact with the fastening devices 17 for fastening the upper edge of the side member to the side edge of the hood member 13.

Each detachable side member 23 is provided with a rod 25 secured to its inner surface and at its lower edge each of the detachable members 23 has a pair of openings 26 to allow the rod 25, which projects through them, to slide under the hook members 27, similar to the hook members 20.

In Fig. 9 I have shown the manner in which the rear end of the central rod 14 rests in the notch 28 in one form of an automobile rim.

Side members 23 are also provided with rods 25 on their under surface. The rods 14, 16, and 21 are connected by wires 31, shown in dotted lines in Fig. 2, which may be secured to the rods by making a saw kerf in the end of the rod and inserting the wire, and then pounding the end of the rod to close the opening.

Where the rod 14 projects rearwardly from the hood portion 13, the saw kerf may be made in the side of the rod, as illustrated in Fig. 8.

In the practical installation and use of my improved summer automobile hood, the hood member 13 is unfolded and placed right-side up above the engine with the rear end of the rod 14 projecting into the opening 29 in the metal mold or frame member 30, as shown in Fig. 8, and with the forward end of the rod 14 resting in the ordinary notch provided therefor.

It may be mentioned that the rods 16 and 21 rest upon suitable members 30 found on the ordinary machine for supporting the metal hood.

The lower ends of the members 18 may be fastened to the hooks 20 and the hood 13 may then be used without the detachable side members 23 if desired when the weather is especially hot.

When it is desired to inclose the engine, the side members 23 are fastened at their upper edges to the side edges of the member 13, and the lower edges of the member 13 are secured to the hooks 27.

When my improved hood or any of its separate parts are not in use they may be readily and easily folded up and placed in a very small space.

Of course, it will be understood that the material used is water proof so as to protect the engine from rain.

A great variety of colors may be used for suiting the taste and fancy of the user.

Some changes may be made in the construction and arrangement of the various parts of my improved hood without departing from the essential purposes and intent of my invention, and it is my purpose to cover by my claims any modified forms of structure or use of mechanical equivalents which may be reasonably included within their scope.

I claim as my invention:

1. A flexible cloth hood for automobiles comprising a cloth cover member, a plurality of rods secured thereto and extending fore-and-aft in the machine, flexible straps secured to the side edges of said hood member having fastening devices at their free ends.

2. A flexible cloth hood for automobiles comprising a cloth cover member, a plurality of rods secured thereto and extending fore-and-aft in the machine, flexible straps secured to the side edges of said hood member having fastening devices at their free ends, a detachable side member, coacting fastening devices on said first described hood member and said detachable side member, and means for fastening the lower edge of said side member to the frame of the machine.

3. In a device of the class described, a hood member having secured thereto a plurality of rods, wires secured to the ends of said rods for flexibly connecting them together, and fastening straps secured to the side edges of said hood member.

4. In a device of the class described, a hood member having secured thereto a plurality of rods, wires secured to the ends of said rods for flexibly connecting them together, fastening straps secured to the side edges of said hood member, detachable side members, coacting fastening devices on the side members and the first described hood member, and means for securing the lower edges of the side members to an automobile frame.

Des Moines, Iowa, July 31, 1918.

MARY A. ILLGEN.

Copies of this patent may be obtained for five cents each, by addressing the "Commissioner of Patents, Washington, D. C."